US009917853B2

(12) United States Patent
Seigel

(10) Patent No.: US 9,917,853 B2
(45) Date of Patent: Mar. 13, 2018

(54) CORRELATING EVENT LOGS TO IDENTIFY A POTENTIAL SECURITY BREACH

(71) Applicant: Dell Products L.P., Round Rock, TX (US)

(72) Inventor: Jake Seigel, Halifax (CA)

(73) Assignee: Quest Software Inc., Aliso Viejo, CA (US)

( * ) Notice: Subject to any disclaimer, the term of this patent is extended or adjusted under 35 U.S.C. 154(b) by 198 days.

(21) Appl. No.: 14/840,739

(22) Filed: Aug. 31, 2015

(65) Prior Publication Data

US 2017/0063884 A1 Mar. 2, 2017

(51) Int. Cl.
*G06F 11/00* (2006.01)
*H04L 29/06* (2006.01)

(52) U.S. Cl.
CPC ................ *H04L 63/1416* (2013.01)

(58) Field of Classification Search
CPC .................................. H04L 63/1416
USPC .......................................... 726/23
See application file for complete search history.

(56) References Cited

U.S. PATENT DOCUMENTS

| | | | |
|---|---|---|---|
| 6,879,995 B1 * | 4/2005 | Chinta | H04L 67/24 709/204 |
| 7,779,021 B1 * | 8/2010 | Smith | G06F 11/3476 707/760 |
| 2009/0198746 A1 * | 8/2009 | Hintze | G06F 17/30 |
| 2009/0254313 A1 * | 10/2009 | Armour | G06F 11/3423 702/187 |

* cited by examiner

*Primary Examiner* — Mohammad W Reza
(74) *Attorney, Agent, or Firm* — Maschoff Brennan

(57) ABSTRACT

Systems and techniques for displaying timelines of event logs are described. A software application may identify event logs associated with an identifier, such as an IP address of a network element or a username. The software application may group the identified event logs based on specified criteria. The software application may determine multiple sessions in which an individual session includes a group of event logs arranged along a timeline. Sessions associated with a same network element may be displayed with a same magnitude. Sessions associated with different network elements may be displayed with different magnitudes. For example, a first timeline of event logs in a first session at a first network element may be displayed at a first height. A second timeline of event logs in a second session at a second network element may be displayed at a second height.

19 Claims, 8 Drawing Sheets

CORRELATING EVENT LOGS TO IDENTIFY A POTENTIAL SECURITY BREACH

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a large computer system, maintaining information security is a difficult task as, in many cases, a security system may have difficulties distinguishing legitimate activities from the unauthorized access of data. Often, after a security incident (such as information theft) has occurred, system administrators may spend a lengthy period of time to determine exactly what damage was done, how access was gained, etc. One of the primary problems is the lack of tools to efficiently identify the impacted areas and the individuals involved in a data breach.

SUMMARY

This Summary provides a simplified form of concepts that are further described below in the Detailed Description. This Summary is not intended to identify key or essential features and should therefore not be used for determining or limiting the scope of the claimed subject matter.

Systems and techniques for displaying timelines of event logs to identify a potential security breach are described. A software application may identify event logs associated with an identifier, such as an IP address of a network element or a username. The software application may group the identified event logs based on specified criteria. The software application may determine multiple sessions, in which an individual session includes a group of event logs arranged along a timeline. Sessions associated with a same network element may be displayed with a same magnitude (e.g., amount). Sessions associated with different network elements may be displayed with different magnitudes (e.g., amounts). For example, a first timeline of event logs in a first session at a first network element may be displayed at a first height. A second timeline of event logs in a second session at a second network element may be displayed at a second height.

BRIEF DESCRIPTION OF THE DRAWINGS

A more complete understanding of the present disclosure may be obtained by reference to the following Detailed Description when taken in conjunction with the accompanying Drawings. In the figures, the left-most digit(s) of a reference number identifies the figure in which the reference number first appears. The same reference numbers in different figures indicate similar or identical items.

DETAILED DESCRIPTION

Figure 1:
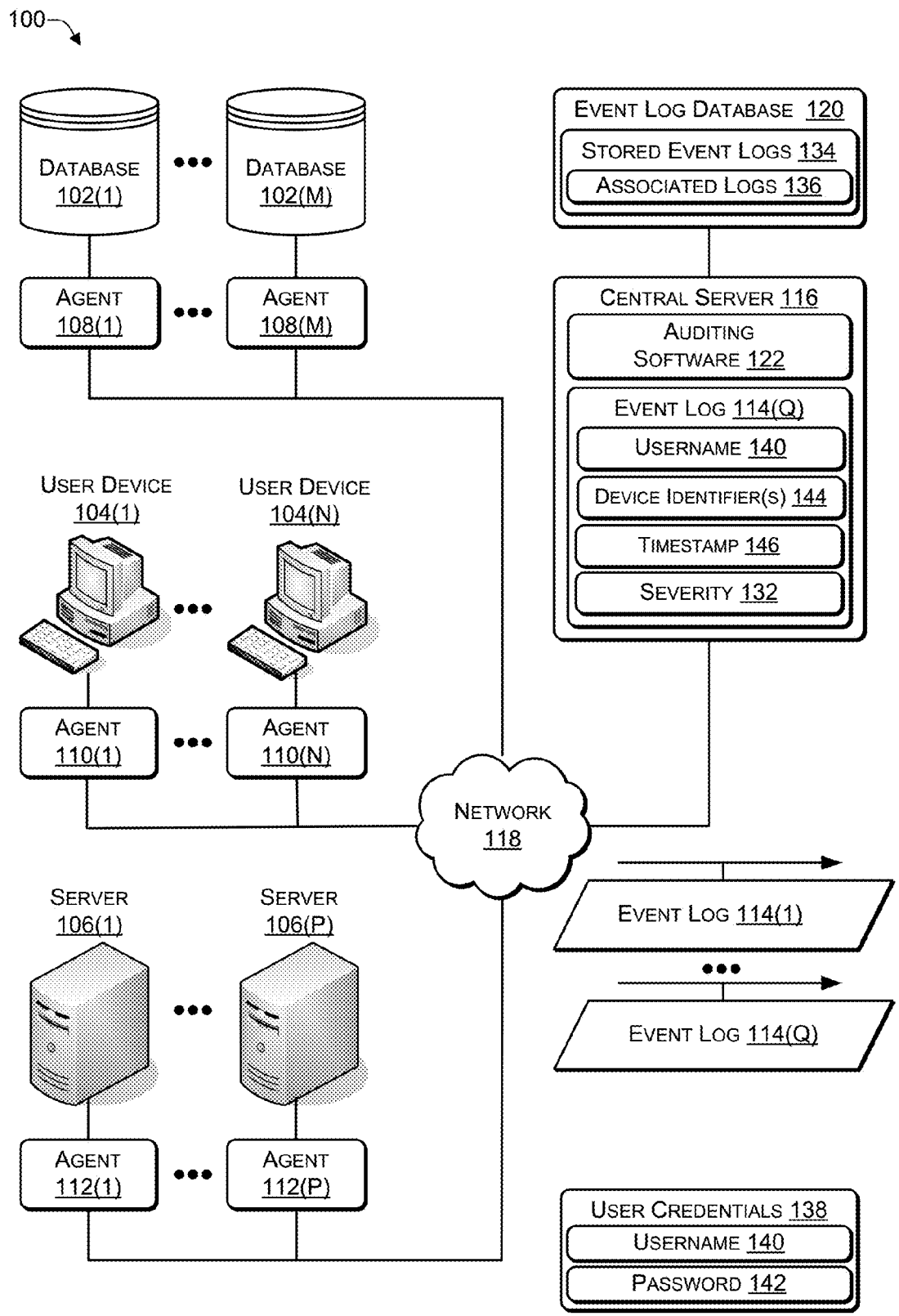
FIG. 1 is a block diagram illustrating a computing system that includes auditing software to monitor event logs according to some embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or video display. The information handling system may also include one or more buses operable to transmit communications between the various hardware components.

Systems and techniques are described herein to monitor and correlate event logs generated by multiple agents to create a visualization associated with user activities to highlight potential security breaches. The visualization may enable information associated with security events, such as security breaches or data breaches, to be ascertained, even in cases where the individual events logs may, by themselves, appear innocuous. For example, a system administrator may select an identifier (e.g., a unique user identifier, a unique device identifier, or the like) to be traced. In some cases, the system administrator may also specify a time interval. The software may identify event logs that are associated with the identifier that were generated within the time interval. The software may correlate the event logs. For example, the software may group event logs based on a location (e.g., a particular device, such as a workstation, a laptop, a server, a database, or the like) associated with each event log. To illustrate, event logs generated by a particular workstation may be identified and grouped together. The software may scan each group of event logs to identify one or more sessions, where a session starts with the occurrence of a specified event, such as a logon event, and includes additional events within the specified time interval that are associated with a particular location. For each session, a timeline that includes the associated event logs may be constructed. For example, the timeline may include the logon event log and other event logs of events that occurred after the logon event and within the specified time interval, such as a file created event log, a file opened event log, a file deleted event log, etc. The timelines of multiple sessions may be aligned to a common (e.g., global) timeline and displayed in a hierarchical manner that enables unusual activities (e.g., activities indicative of suspicious or malicious activities) to be identified. In some cases, the software may highlight portions of the sessions that are indicative of malicious activity. For example, sessions may be displayed with the timeline along the X-axis. Sessions associated with the same network element may be displayed at a same height on the Y-axis while sessions associated with different network elements may be displayed at different magnitudes on an axis (e.g., height on the Y-axis). By identifying and correlating event logs and displaying them in such a manner, a system administrator may be able to easily identify the details associated with a security breach, such as which network element(s) had a logon occur, which other network element(s) were accessed, which data was accessed, etc. For example, in a conventional system, a system administrator viewing individual event logs or a group of event logs may determine that the event logs do not appear to be indicative of malicious activity. By using the systems and techniques described herein to correlate and visually display the sessions hierarchically across a timeline, the system administrator may determine that a security breach occurred and determine the details associated with the security breach. Thus, the systems and techniques described herein may enable a system administrator to easily determine the details associated with a security breach that would be difficult to identify in a conventional system.

Thus, event logs associated with an identifier may be correlated and displayed using vertically stacked timelines that include different aspects of user activity associated with an authenticated username along with the network element(s) (e.g., workstation, database, server, etc.) being accessed by the user activity. The event logs may be displayed in a way that provides an organized contextual view of a user's activity. The organized contextual view enables the viewer to easily identify data breaches or compromised accounts and forensically track down the full impact of a breach, while reducing false positives. Event logs are selected for viewing based on user identities and server locations, and then visually rendered in a way that enables the impact of the data breach to be ascertained. The organized contextual view may enable relationships between events to be seen in a manner that may be difficult to achieve using raw event logs or even auditing software. The organized contextual view separates events to enable the relationships between events to be graphically viewed. Multiple horizontal timelines for user activity may be grouped together based on an authenticated identity while additional timelines may be stacked horizontally based on an originating address of the event logs associated with the user activity. For example, the organized contextual view may enable views of a situation in which a user logs on to a workstation using a first identity (e.g., a first set of credentials), logs out and then logs on using a second identity (e.g., a second set of credentials) and performs activities on the same workstation using the second identity. Another advantage of the organized contextual view is that the activity data of one or more user identities are aggregated into a single display in which the events are displayed using parallel timelines. This temporal view of the event logs may provide a holistic story of a user's activities across multiple computers.

FIG. 1 is a block diagram illustrating a computing system 100 that includes auditing software to monitor event logs according to some embodiments. The computing system 100 may include multiple types of network elements, including a representative one or more databases, such as a database 102(1) to a database 102(M), a representative one or more user devices, such as a user device 104(1) to a user device 104(N), and a representative one or more servers, such as a server 106(1) to a server 106(P), where M>1, N>1, and P>1, and where M, N, and P are not necessarily the same. Of course, the computing system 100 may include other network elements besides the databases 102, the user devices 104, and the servers 106. The user devices 104 may include workstations, laptops, tablets, wireless phones, other types of computing devices used to access other network elements of the computing system 100, or any combination thereof.

The network elements of the computing system 100 may have an associated agent that monitors a particular component and generates an event log, such as one of event logs 114(1) to 114(Q) (where Q>1), when an event occurs. For example, each of the agents 108(1) to 108(M) may be associated with a particular one of the databases 102(1) to 102(M) (e.g., the agent 108(1) may be associated with the database 102(1) and the agent 108(M) may be associated with the database 102(M)). The agents 108 may monitor the databases 102 and generate one of the event logs 114 when a particular event occurs. For example, the agents 108 may generate an event log each time one of the databases 102 is accessed, e.g., each time (i) data is added to one of the databases 102, (ii) deleted from one of the databases 102, (iii) changed in one of the databases 102, or (iv) data is read from one of the databases 102.

Each of agents 110(1) to 110(N) may be associated with a particular one of the user devices 104(1) to 104(N) (e.g., the agent 110(1) may be associated with the user device 104(1) and the agent 110(N) may be associated with the user device 104(N)). The agents 110 may monitor the user devices 104 and generate one of the event logs 114 when a particular event occurs. For example, the agents 110 may generate an event log each time a login occurs on one of the user devices 104, each time of the user devices 104 is used to access one of the databases 102 or one of the servers 106, etc.

Each of agents 112(1) to 112(P) may be associated with a particular one of the servers 106(1) to 106(P) (e.g., the agent 112(1) may be associated with the server 106(1) and the agent 112(P) may be associated with the server 106(P)). The agents 110 may monitor the servers 106 and generate one of the event logs 114 when a particular event occurs. For example, the agents 112 may generate an event log each time one of the servers 106 is accessed.

A central server 116 may receive the event logs 114(1) to 114(Q) from one or more of the agents 108, 110, or 112 via a network 118. The central server 116 may store at least a portion of the event logs 114 in a database, such as an event log database 120. For example, the central server 116 may store a portion of the events logs 114 that are classified as sufficiently important to be stored. As another example, each of the event logs 114 may be assigned a priority and deleted from the database at a predetermined time based on the priority. For example, low priority event logs may be deleted from the event log database 120 after a relatively short time while higher priority event logs may not be deleted from the event log database 120 or may be deleted after a much longer period of time.

The central server 116 may include one or more processors and one or more computer readable storage media to store auditing software 122. The auditing software 122 may be executed by the one or more processors of the central server 116 to perform various functions. For example, the auditing software 122 may receive an identifier, analyze and correlate events stored in the event log database 120, group the events based on location, identify sessions in each group of events, and render the sessions for display on a display device, such as a monitor device.

The agents 108, 110, and 112 may monitor activities (e.g., events) occurring at network elements (e.g., components) of the network 118, such as the databases 102, the user devices 104, and the servers 106. For example, the agents 108 may monitor actions performed on the databases 102, including actions such as reading data from the databases 102, writing data to the databases 102, modifying data stored in the databases 102, deleting data stored in the databases 102, etc. The agents 108 may monitor which action(s) are being performed to the databases 102, to which of the databases 102(1) to 102(M) the action is being performed, a user identifier (or process identifier) that is initiating the action, how many actions are being performed in a predetermined period of time, etc.

The agents 110 may monitor activities associated with the user devices 104, such as user identifiers used to login to each of the user devices 104, which network elements (e.g., other user devices 104, the databases 102, or the servers 106) are accessed by each of the user devices 104, an amount of data sent from each of the user devices 104, an amount of data received by each of the user devices 104, etc.

The agents 112 may monitor activities associated with the servers 106, such as how each of the servers 106 is being accessed, which network elements (e.g. the user devices 104) are accessing each of the servers 106, a number of transactions received by each of the servers 106, a number of transactions sent by each of the servers 106, a number of transactions processed by each of the servers 106, etc.

The agents 108, 110, and 112 may generate the event logs 114(1) to 114(Q) (where Q>1) based on monitoring the activities of the databases 102, the user devices 104, or the servers 106, respectively. Each of the event logs 114 may be associated with one or more activities. For example, the event log 114(1) may be associated with the occurrence of a single activity and the event log 114(Q) may be associated with the occurrence of more than one activity. To illustrate, one of the event logs 114 may be generated each time data stored in one of the databases 102 is accessed.

Each of the event logs 114 may be generated based on detecting one or more activities. At least a portion of the event logs 114 may be generated in response to detecting activities that are indicative of malicious activities performed by malware or by an unauthorized user. For example, the agent 108(M) may generate the event log 114(Q) in response to determining that more than a threshold number of attempts were made to access the database 102(M) using incorrect credentials. The agent 108(M) may generate the event log 114(Q) in response to determining that more than a threshold number of actions were performed by the agent 110(N) to the database 102(M) within a predetermined period of time. For example, the event log 114(Q) may be generated when the agent 110(N) performs 100 (or more) transactions to the database 102(M) within a five minute time period because such activity may be indicative of malicious activity performed by malware or by an unauthorized user. The agent 110(N) may generate the event log 114(Q) in response to determining that more than a threshold number of attempts were made to login to one (or more) of the user devices 104(1) to 104(N) within a predetermined period of time using incorrect credentials. The agent 110(N) may generate the event log 114(Q) in response to determining that more than a threshold number of transactions were initiated within a predetermined period of time by the user device 104(N). For example, the agent 110(N) may generate the event log 114(Q) in response to determining that more than 100 transactions were initiated within a five minute time period by the user device 104(N) because such activity may be indicative of malicious activity performed by malware or by an unauthorized user. The agent 112(P) may generate the event log 114(Q) in response to determining that more than a threshold number of transactions were initiated by the server 106(P) within a predetermined period of time. Thus, the agents 108, 110, and 112 may generate the event logs 114 based on detecting activities that are indicative of malicious activity.

The conditions (e.g., X number of transactions performed within Y seconds, where X>0 and Y>0) that cause the event logs 114 to be generated may be defined by a system administrator, determined using a classifier (e.g., trained using machine learning), or a combination of both, e.g., determined using a classifier and then adjusted by the system administrator.

The auditing software 122 may receive the event logs 114 from one or more of the agents 108, 110, or 112. In some cases, the auditing software 122 may receive the event logs 114 and determine which of the event logs 114 to store (e.g., archive) in the event log database 120. For example, a portion of the event logs 114(1) to 114(Q) may be stored in the event log database 120 as stored event logs 134 while a remainder of the event logs 114 may not be stored in the event log database 120. In some cases, the auditing software 122 may receive the event logs 114, assign a severity 132 to each of the events logs 114, and store the event logs 114 in the event log database 120.

The severity 132 may be an integer, a real number, etc. For example, a simple severity scheme from 1 to 3 may use high severity (e.g., "3"), medium severity (e.g., "2"), and low severity (e.g., "1"). To illustrate, one failed login attempt may be assigned a low severity whereas multiple failed login attempts on multiple user devices within a predetermined period of time may be assigned a high severity. Of course, the severity scheme may be expanded, such as having high severity as "10" and low severity as "1" etc. The severity associated with a particular alert profile or with a particular event log may be determined by a classifier trained using machine learning, by a system administrator, or both.

The auditing software 122 may be capable of tracing identifiers, such as an identifier associated with a user or an identifier associated with a network element. For example, each user of the computing system 100 may be provided with a set of user credentials 138 that includes a username 140 (e.g., user identifier) and a password 142. The username 140 may include an identifier that uniquely identifies each user within the computing system 100. A unique identifier may be associated with each of the network elements 102, 104, 106, such as an internet protocol (IP) address, serial number, media access control (MAC) address, or other unique device identifier. Each of the event logs 114 may include a user identifier, one or more device identifiers, or both. Each of the event logs 114 may include a timestamp 146 identifying approximately when an associated event occurred. For example, the event log 114(Q) may include (i) the username 140 of a user whose activity caused the event log 114(Q) to be generated, (ii) one or more device identifiers 144 (e.g., IP address or other unique identifier) of the network elements 102, 104, or 106 associated with the activity that caused the event log 114(Q) to be generated, or (iii) both the user name 140 and the device identifier(s) 144. For example, when a user uses the user credentials 138 to logon to the user device 104(N), the event log 114(Q) may indicate that a logon event occurred in which a user with the user credentials 138 logged on to the user device 104(N) having the device identifier 144. As another example, when a user accesses data stored on the server 106(P) using the user device 104(N), the event log 114(Q) may indicate that a data read event occurred in which a user with the user credentials 138, logged on to a first device (e.g., the user device 104(N)) having a first device identifier included in the device identifiers 144, to access data stored on a second device (e.g., the server 106(P)) having a second device identifier included in the device identifiers 144. In this example, the device identifiers 144 may include both the device identifier from which an activity was initiated (e.g., the user device 104(N)) and the device identifier of the device(s) (e.g., the server 106(P)) to which the activity was directed.

The auditing software 122 may perform an analysis of at least a portion of the stored event logs 134. For example, a system administrator may select an identifier, such as the user name 140 or one of the device identifiers 144 and the auditing software 122 may identify one or more of the stored event logs 134, e.g., associated logs 136, that are associated with the identifier. In some cases, the system administrator may specify a time interval in addition to the identifier and the auditing software 122 may identify one or more of the stored event logs 134 associated with the identifier within the specified time interval, e.g., the associated logs 136. The auditing software 122 may group the associated logs 136 based on a location (e.g., a network element, such as one of the user devices 104) associated with each of the associated logs 136. The auditing software 122 may identify one or more sessions associated with each location. Each session may include a particular type of event log, such as a logon event. For example, each session may start with a logon event (e.g., either successful or unsuccessful), at a particular location (e.g., network element), and include other event logs associated with the particular location that were generated after the particular type of event log. Each session may include an event logoff, an event that occurred within a specified interval, or the like. For example, a session may start with a logon event, include various events associated with a device on which the logon occurred, and end with a logoff event. As another example, a session may start with a logon event and include various events associated with a device on which the logon occurred up to and including events that occurred within a specified time period. The timeline associated with each session may be aligned (e.g., with each other or to a common timeline) and displayed such that the sessions may be viewed to identify potential security breaches. For example, in some implementations, the sessions at a same location may be displayed at a same height on the Y-axis and the sessions at different locations may be displayed at different heights on the Y-axis. Such a view may enable the system administrator to identify security breaches and details associated with the security breaches such as how the breach occurred, on which machine the breach occurred, which data was accessed, etc. that would be not be easily identified merely by viewing a portion of the stored event logs 134.

Thus, in the computing system 100, the agents 108, 110, and 112 may monitor activities associated with various network elements, such as the databases 102, the user devices 104, and the servers 106. The agents 108, 110, 112 may generate the one or more event logs 114 based on monitoring the activities. Each of the event logs 114 may be associated with one (or more) activities. The event logs 114 may be sent to the central server 116 and stored in the event log database 120 as the stored event logs 134. The auditing software 122 may perform an analysis of the stored event logs 134 based on a selection of an identifier (e.g., user identifier or network element identifier) and graphically display sessions associated with the identifier. For example, the sessions may be displayed with each session's timeline on the X-axis and the network element associated with each session on the Y-axis. Such a display may enable details associated with a security breach to be easily identified.

Figure 2:
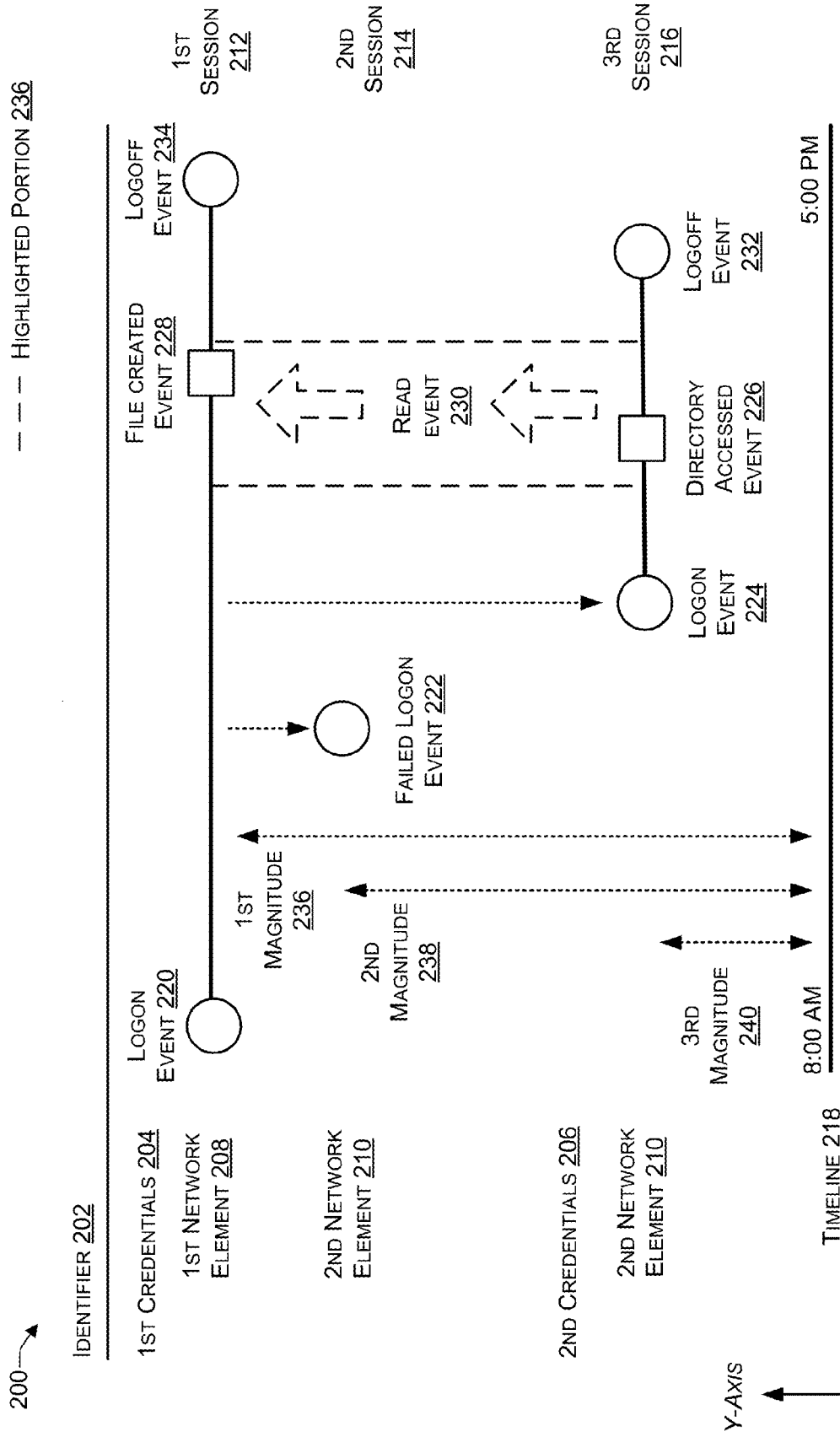
FIG. 2 is a block diagram illustrating one or more sessions that include a failed logon event according to some embodiments.

FIG. 2 is a block diagram illustrating a graphical user interface (GUI) 200 that includes correlated user activities that include a failed logon event according to some embodiments. For example, the auditing software 122 may receive a selection of an identifier 202, perform an analysis of the stored event logs 134, and display the GUI 200 on a display device.

In this example, a company with a computer network that includes the computer system 100 of FIG. 1 may determine that confidential data was breached. To determine more information about the breach, a system administrator may select an identifier 202 (and, in some cases, a time interval) and instruct the auditing software 122 to identify and correlate event logs associated with the identifier 202. In response, the auditing software 122 may display the GUI 200. The identifier 202 may be a user identifier (e.g., username) of a set of user credentials, such as first credentials 204 or second credentials 206. As another example, the identifier 202 may be a network element identifier (e.g., IP address) of a network element, such first network element 208 or of second network element 210. The network element 208 or 210 may be one of the databases 102, the user devices 104, or the servers 106 of FIG. 1. The auditing software 122 may identify the associated logs 136 from the stored event logs 134 of FIG. 1 and group the associated logs 136 based on location, e.g., based on which network element is associated with the event logs.

For each location (e.g., the network elements 208, 210), the auditing software 122 may identify one or more sessions. For example, the auditing software 122 may identify a first session 212 associated with the first network element 208 and identify a second session 214 and a third session 216 associated with the second network element 210. The sessions 212, 214, and 216 may be aligned with a common timeline 218. The auditing software 122 may identify first session 212 based on a successful logon event 220, may identify the second session 214 based on a failed logon event 222, and may identify the third session 216 based on a successful logon event 224.

In some cases, a size or a color of an event displayed in a session (e.g., one of the sessions 212, 214, or 216) may correspond to a severity of the event. For example, in a system that ranks events as having a high severity, a medium severity, or a low severity, an event that is designated (e.g., by a system administrator) as having a high severity may be displayed on a session's timeline using a large graphical icon or a bright color, such as red. An event that is designated as having a medium severity may be displayed on a session's timeline using a slightly smaller graphical icon or a slightly duller color, such as orange. An event that is designated as having a low severity may be displayed on a session's timeline using a relatively small graphical icon or a relatively duller color, such as yellow.

In FIG. 2, around 8:00 AM, a user successfully logs on to the first network element 208 (e.g., one of the user devices 104) using the first credentials 204, causing an agent (one of the agents 108, 110, or 112 of FIG. 1) to generate an event log for the logon event 220. The user then unsuccessfully attempts to log on to the second network element 210 using the first credentials 204, causing an agent to generate an event log for the failed logon event 222. The user then successfully logs on to the second network element 210 (e.g., one of the databases 102 or the servers 106) using the second credentials 206, causing an agent to generate an event log for the logon event 224. The user accesses a directory on the second network element 210, causing an agent to generate an event log for a directory accessed event 226. The user creates a file on the first network element 208, causing an agent to generate an event log for a file created event 228. The user copies data from the directory on the second network element 210 to the file created on the first network element 208, causing an agent to generate an event log for a read event 230. The user logs off from the second network element 210, causing an agent to generate an event log for a logoff event 232. Around 5:00 PM, the user logs off from the first network element 208, causing an agent to generate an event log for a logoff event 234.

As illustrated in FIG. 2, the timeline 218 extends across the X-axis while the sessions 212, 214, and 216 are stacked horizontally based on the credentials and with each credential, based on the network element. Of course, the auditing software 122 may display the correlated event logs using other types of visual representations besides what is illustrated in FIG. 2. For example, in some cases, a system administrator may specify which types of events are displayed on which axis, a hierarchy to use when displaying the correlated event logs, and other parameters related to displaying a visualization of event logs associated with the identifier 202. The hierarchy illustrated in FIG. 2 has the identifier 202 at the top level, the credentials 204, 206 at a level below the identifier, and the network elements 208, 210 at a level below the credentials. The first session 212 is associated with the first credentials 204 logged on to the first network element 208 and may be displayed with a first magnitude 236 on an axis (e.g., a first height on the Y-axis). The second session 214 is associated with the first credentials 204 attempting to log on to the second network element 210 and may be displayed with a second magnitude 238 (e.g., a second height on the Y-axis). The third session 216 is associated with the second credentials 206 logged on to the second network element 210 and may be displayed with a third magnitude 240 (e.g., a third height on the Y-axis).

A system administrator viewing the GUI 200 may see that two sets of credentials were accessed from a single originating address (e.g., the identifier 204). In some companies, an employee may authenticate more than one set of credentials to perform certain actions on the network. Therefore, using two different sets of credentials from a single origin address (e.g., IP address) may not, by itself, be indicative of a security breach.

The identifier 202 indicates the identifier for which event logs have been correlated and displayed in the GUI 200. The credentials 204, 206 show the credentials that a user provided when performing a logon. The timelines portrayed by the sessions 212, 214, and 216 allow a viewer to view the events generated by a user's activities within a context rather than merely as individual events. For each of the credentials 204, 206, the GUI 200 displays a timeline of events as a session occurring on one or more network elements, such as the network elements 208, 210. For example, a user logged onto the first network element 208 using the first credentials and then attempted to logon to the second network element 210 using the first credentials 204. The failed logon event 222 indicates that the user was unsuccessful in using the first credentials 204 to logon to the second network element 210. In many companies, the failed logon event 222, by itself, may not be enough to indicate a possible security breach. As previously mentioned, multiple event logs, such as the underlying event logs used to create what is displayed in the GUI 200, may not include enough information by themselves to adequately detect security breaches. However, by displaying a context within which to interpret the event logs, a system administrator may see a more complete picture of the events.

For example, after the failed logon event 222 using the first credentials on the second network element 210, the user uses the second credentials 206 to successfully logon to the second network element 210. In addition, the directory access event 226 indicates that a directory containing sensitive data was accessed. Furthermore, the file created event 228 on the first network element 208 and the read event 230 indicates that data was copied from a directory on the second network element 210 to a created on the first network element 208. The auditing software may highlight one or more portions of the sessions 212, 214, and 216 that are indicative of a potential security breach. For example, in the FIG. 2 a highlighted portion 236 is illustrated using dashed lines just prior to the directory accessed event 226 and up to and including the file created event 228. The highlighted portion 236 enables a system administrator (or other user) to visually see which data was breached and how the breach occurred, e.g., someone logged onto the first network element 208 using the first credentials 204 and, via a network, logged into the second network element 210 using the second credentials 206. Once the user was able to successfully logon to the second network element 210, the user accessed a particular directory and copied at least some of the data from the directory to a new file created on the first network element 208.

If the system administrator merely looks at event logs for the second network element 210, the event logs may appear normal. Similarly, the event logs of the activities performed by the user using the first credentials, e.g., events depicted in the first session 212, by themselves, may also appear normal. Even the file created event 228, by itself, may appear innocuous. It is when the multiple credentials, the multiple network elements, and the sessions associated with each network element are correlated and displayed, is the system administrator able to view a complete picture of the security breach.

Thus, auditing software may group event logs associated with a particular identifier based on the network elements that are accessed and based on the credentials used to access the network elements. The auditing software may display the grouped event logs as stacked session timelines to enable a system administrator to easily identify details associated with a security breach (e.g., a data breach). The details associated with a security breach may not be obvious when merely displaying individual event logs, event logs associated with a particular set of credentials, or event logs associated with a particular network element. However, when visually displayed as described herein, the details associated with the security breach may be easily understood.

Figure 3:
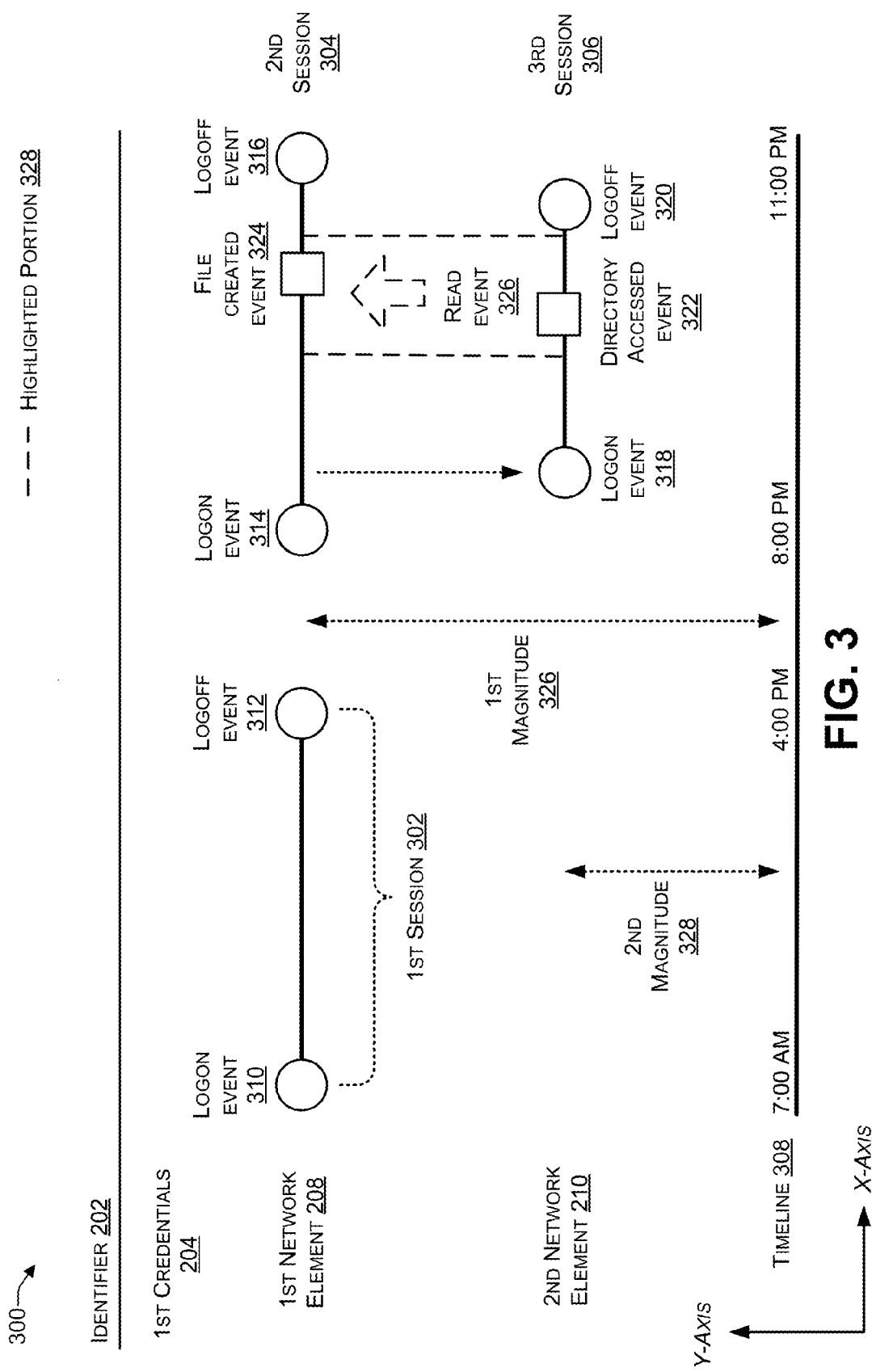
FIG. 3 is a block diagram illustrating one or more sessions that include a file created event according to some embodiments.

FIG. 3 is a block diagram illustrating a graphical user interface (GUI) 300 that includes a file created event according to some embodiments.

In this example, a company with a computer network that includes the computer system 100 of FIG. 1 may determine that confidential data was breached. To determine more information about the breach, a system administrator may select the identifier 202 (and, in some cases, a time interval) and instruct the auditing software 122 to identify and correlate event logs associated with the identifier 202. In response, the auditing software 122 may display the GUI 300. The identifier 202 may be a user identifier (e.g., username) of a set of user credentials, such as the first credentials 204. As another example, the identifier 202 may be a network element identifier (e.g., IP address) of a network element, such as the first network element 208 or the second network element 210. The network element 208 or 210 may be one of the databases 102, the user devices 104, or the servers 106 of FIG. 1. The auditing software 122 may identify the associated logs 136 from the stored event logs 134 of FIG. 1 and group the associated logs 136 based on location, e.g., based on which network element is associated with the event logs.

For each location (e.g., the network elements 208, 210), the auditing software 122 may identify one or more sessions. For example, the auditing software 122 may identify a first session 302 and second session 304 associated with the first network element 208 and identify a third session 306 associated with the second network element 210. The sessions 302, 304, and 306 may be aligned with a common timeline 308. The auditing software 122 may identify the first session 302 based on a logon event 310 and a logoff event 304. The auditing software 122 may identify the second session 304 based on a logon event 314 and a logoff event 316, and may identify the third session 306 based on a logon event 318 and a logoff event 320. FIG. 3 illustrates how two or more sessions, such as the sessions 302, 304, may be displayed at a same height on the Y-axis when the sessions occur on the same network element using the same set of credentials. Sessions that occur on a different network element (or that use different credentials) may be displayed at different heights on the Y-axis. For example, the third session 306 may be displayed at a different height on the Y-axis than the sessions 302, 304 because the third session 306 includes events associated with the second network element 210 while the sessions 302, 304 include events associated with the first network element 208.

In FIG. 3, around 7:00 AM, a user successfully logs on to the first network element 208 (e.g., one of the user devices 104) using the first credentials 204, causing an agent (one of the agents 108, 110, or 112 of FIG. 1) to generate an event log for the logon event 310. Around 4:00 PM, the user logs off of the first network element 208, causing an agent to generate an event log for the logoff event 312. Around 8:00 PM, the user logs on to the first network element 208 using the first credentials 204, causing an agent to generate an event log for the logon event 314.

The user then successfully logs on to the second network element 210 (e.g., one of the databases 102 or the servers 106) using the first credentials 204, causing an agent to generate an event log for the logon event 318. The user accesses a directory on the second network element 210, causing an agent to generate an event log for a directory accessed event 322. The user creates a file on the first network element 208, causing an agent to generate an event log for a file created event 324. The user copies data from the directory on the second network element 210 to the file created on the first network element 208, causing an agent to generate an event log for a read event 326. The user logs off from the second network element 210, causing an agent to generate an event log for the logoff event 320. Around 11:00 PM, the user logs off from the first network element 208, causing an agent to generate an event log for the logoff event 316.

The auditing software 122 may display a highlighted portion 328 identifying one or more portions of the sessions 302, 304, and 308 that may be indicative of a security breach. For example, in FIG. 3, the highlighted portion 328 may include portion of the sessions 304, 306 just prior to the directory accessed event 322 up to and including the file created event 324. The highlighted portion 328 enables a system administrator (or other user) to visually see which data was breached and how the breach occurred.

Merely viewing the event logs associated with the first network element 208, a system administrator might conclude that a user was logged into the first network element 208 (e.g., one of the user devices 104, such as a laptop) during normal business hours and then logged on again at night to do some more work. However, the hierarchical view shown in FIG. 3, may identify additional details. For example, the first session 302 and the second session 304 that are associated with when the first credentials 204 are used to log on to the first network element 208, may be displayed with a first magnitude 326 on an axis. The third session 306 associated with when the first credentials 204 are used to log on to the second network element 210, may be displayed with a second magnitude 328 on an axis. Viewing the multiple sessions 302, 304, and 306 against the timeline 308 shows that after the user logged on in the evening (around 8:00 PM), the user logged on to the second network element 210 using the first credentials 204 and accessed data in a directory of the second network element 210. Depending on the user's responsibilities, the GUI 300 may be considered normal or as a security breach. For example, if the user had access to data stored on the second network element 210 and made use of the data as part of the user's responsibilities, then the events 318, 322, and 320 in the third session 306 may be considered normal. If the user did not have access to the data stored on the second network element 210 and did not use the data as part of the user's responsibilities, then the events 318, 322, and 320 in the third session 306 may be considered a security breach.

In the flow diagrams of FIGS. 4, 5, 6, and 7, each block represents one or more operations that can be implemented in hardware, software, or a combination thereof. In the context of software, the blocks represent computer-executable instructions that, when executed by one or more processors, cause the processors to perform the recited operations. Generally, computer-executable instructions include routines, programs, objects, modules, components, data structures, and the like that perform particular functions or implement particular abstract data types. The order in which the blocks are described is not intended to be construed as a limitation, and any number of the described operations can be combined in any order and/or in parallel to implement the processes. For discussion purposes, the processes 400, 500, and 600 are described with reference to FIGS. 1, 2, and 3 as described above, although other models, frameworks, systems and environments may implement these processes.

Figure 4:
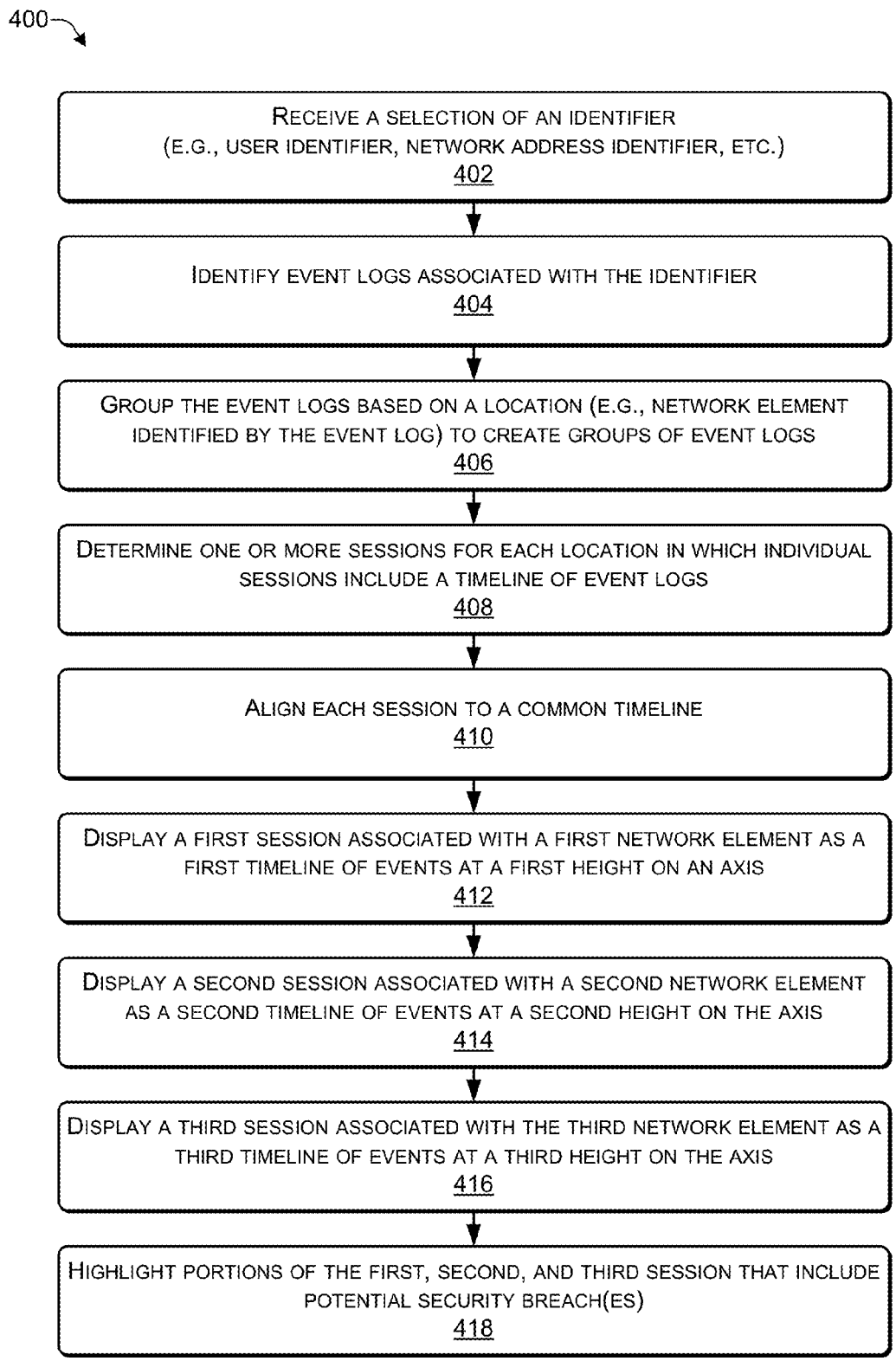
FIG. 4 is a flowchart of a process that includes identifying events associated with an identifier according to some embodiments.

FIG. 4 is a flowchart of a process 400 that includes identifying events associated with an identifier according to some embodiments. The process 400 may be performed by a software application, such as the auditing software 122 of FIG. 1.

At 402, a selection of an identifier is received. At 404, event logs associated with the identifier are identified. For example, in FIG. 1, the auditing software 122 may receive an identifier, such as a user identifier (e.g., the username 140) or a device identifier (e.g., an IP address of one of the network elements 102, 104, or 106). The auditing software 122 may identify the associated logs 136 that are associated with the identifier from the stored event logs 134 in the event log database 120. For example, in FIG. 2, the event logs 220, 222, 224, 226, 228, 230, 232, and 234 may be identified as being associated with the identifier 202. The identifier 202 may be a user identifier (e.g., username) of the first credentials 204, a user identifier of the second credentials 206, a device identifier of the first network element 208, or a device identifier of the second network element 210.

At 406, the event logs are grouped based on specified criteria to create groups of event logs. For example, the specified criteria may include a location. To illustrate, in FIG. 1, the associated logs 136 may be grouped based on a location (e.g., a network element) associated with each event log of the associated logs 136. For example, event logs may be grouped to create a first group of event logs that include a first device identifier associated with a first network element. The event logs may be grouped to create a second group of event logs that include a device identifier associated with a second network element. For example, in FIG. 2, a first group of event logs (used to create the first session 212) may include the event logs 220, 228, 230, and 234 that are associated with a same location, e.g., the first network element 208. A second group of event logs (used to create the sessions 214, 216) may include the event logs 222, 224, 226, 230, and 232 associated with the second network element 210. Note that the read event 230 is common to both the first group of events and the second group of events because the first network element 208 may send a read command to the second network element 210 and, in response, the second network element 210 may send data to the first network element 208, thereby causing the read event log 230 to be created.

The identifier 202 may be associated with a device from which an activity was initiated or a device to which the activity was directed. For example, an event log of the read event 230 may include a requesting device identifier of the first network element 208 that sent a read request to the second network element 210 and a receiving device identifier of the second network element 210 that received (and responded to) the read request.

At 408, one or more sessions for each location (e.g., network element) may be identified. An individual session (of the one or more sessions) may include a timeline of event logs, For example, event logs associated with a network element may be ordered based on a timestamp (e.g., the timestamp 146 of FIG. 1) included in each event log to create a timeline. Individual sessions may include a specified event. For example, a session may begin when a logon event, e.g., either a successful logon event or an unsuccessful logon event, is identified in a group of events logs. Thus, two sessions may be identified from a group of events that include two logon events, three sessions may be identified from a group of events that include three logon events, etc. For example, in FIG. 3, a first group of event logs associated with the first network element 208 may include the events 310, 312, 314, 316, 324, and 326. The first group of event logs may be used to identify the first session 302 and the second session 304. A second group of event logs associated with the second network element 210 may include the events 318, 320, 322, and 326. The second group of event logs may be used to identify the third session 306. In FIG. 3, a session may be created by identifying a specified first event (e.g., a logon event) that initiates the session and a specified second event (e.g., a logoff event) that ends the session. For example, the first session 302 may be created by identifying the events 310 and 312. The second session 304 may be created by identifying the events 314, 316, and other events (e.g., the events 324 and 326) associated with the first network element 208 that occur within a time period of the timeline 308.

At 410, each session may be aligned to a common timeline. For example, in FIG. 2, the sessions 212, 214, and 216 may be aligned to the common timeline 218. As another example, in FIG. 3, the sessions 302, 304, and 306 may be aligned to the common timeline 308.

At 412, a first session associated with a first network element may be displayed as a first timeline of events at a first height on an axis. At 414, a second session associated with a second network element may be displayed as a second timeline of events at a second height on the axis. At 416, a third session associated with a third network element may be displayed as a third timeline of events at a third height on the axis. For example, in FIG. 2, the first session 212 is displayed at a first height on the Y-axis, the second session 214 is displayed at a second height on the Y-axis, and the third session 216 is displayed at a third height on the Y-axis. In FIG. 3, the first session 302 and the second session are both displayed at a first height on the Y-axis because they are associated with a user with the first credentials 204 that logs on on to the first network element 208 during the timeline 308. In FIG. 3, the third session 306 is displayed at a second height on the Y-axis. Thus, the height at which the auditing software 122 displays the sessions 212, 214, and 216 may be based on (1) the network element associated with the events and (ii) the credentials associated with the network element. When a same set of credentials is used to logon to a same network element, each logon (e.g., successful logon or unsuccessful logon) may be used to create a session that is displayed at a same height, such as the sessions 302 and 304 of FIG. 3. When a same set of credentials is used to logon to different network elements, each logon (e.g., successful logon or unsuccessful logon) may be used to create a session that is displayed at a different height, such as the sessions 304 and 306 of FIG. 3. When two (or more) different sets of credentials are used to logon to a same network element, each logon (e.g., successful logon or unsuccessful logon) may be used to create a session that is displayed at a different height, such as the sessions 212 and 216 of FIG. 2.

At 418, portions of the first session, the second session, and the third session that include potential security breaches may be highlighted. For example, in FIG. 2, the highlighted portion 236 may include the directory accessed event 226, the file created event 228, and the read event 230. As another example, in FIG. 3, the highlighted portion 328 may include the directory accessed event 322, the file created event 324, and the read event 326.

Thus, a system administrator may identify potential security breaches by selecting an identifier (e.g., a username or a unique user identifier, such as an IP address). In some cases, the system administrator may specify a time interval to filter the event logs. Auditing software may identify event logs associated with the identifier within the specified time interval and group the event logs based on a location (e.g., network element) associated with each event log. For example, event logs generated as a result of activities performed by a user logged on to a first network element and accessing a second network element may be identified based on (i) an identifier (e.g., a username) used by the user to logon to the network element, (ii) a first device identifier (e.g., an IP address) of the first network element, or (iii) a second device identifier of the second network element. Each group of event logs may be analyzed to identify one or more sessions that include a specified event, such as a logon event. For example, for each group of events, the auditing software 122 may identify and create one or more sessions in which each session starts with a logon event. The session may include events that occur after the logon event within the specified time interval. A session may end with a failed logon event, a logoff event, when a timestamp of a next event is outside the specified time interval, or another type of specified event. Events in a session may be ordered according to a timestamp (e.g., the timestamp 146 of FIG. 1) of the events in the session to create a timeline of events.

The sessions may be aligned to a common timeline and displayed in at least two dimensions. For example, timeline of events in a session may be aligned to a timeline displayed on an X-axis and a height on the Y-axis of the session may depend on the credentials and the network element associated with the session. The events displayed in each session may be visually displayed to distinguish between a severity of each event. For example, an event in a session may be displayed using a shape (or graphical image). The shape (or the graphical image) may have a particular size. The shape (or the graphical image) may have a particular color. The shape, size, color, or any combination thereof may be based on the severity of the event that is displayed in the session. For example, a large sized hexagonal shape box may be used to display events with a high severity, a medium sized orange triangle may be used to display events with a medium severity, and a small sized yellow circle may be used to display events with a low severity.

The sessions that are created based on the groups of event logs may be displayed in a hierarchical manner, with a height and indentation of each session depending on the credentials, the network element, and other event log related information. The hierarchy may be configurable such that a system administrator may display the same data using different hierarchical views. For example, each hierarchical configuration may be designed to identify specific types of information associated with a security breach. To illustrate, a first hierarchical view may be used to view different credentials used to access network elements while a second hierarchical view may be used to view locations that are being accessed, etc.

The auditing software may identify (e.g., using highlighting or another technique) portions of the sessions that may indicate a security breach. The hierarchical visual display of the sessions may enable a system administrator to identify details associated with a security breach, such as the user credentials used during the security breach, the network elements accessed during the security breach, the data accessed during the security breach, when the security breach occurred, how the security breach occurred, other information associated with the security breach, or any combination thereof.

Figure 5:
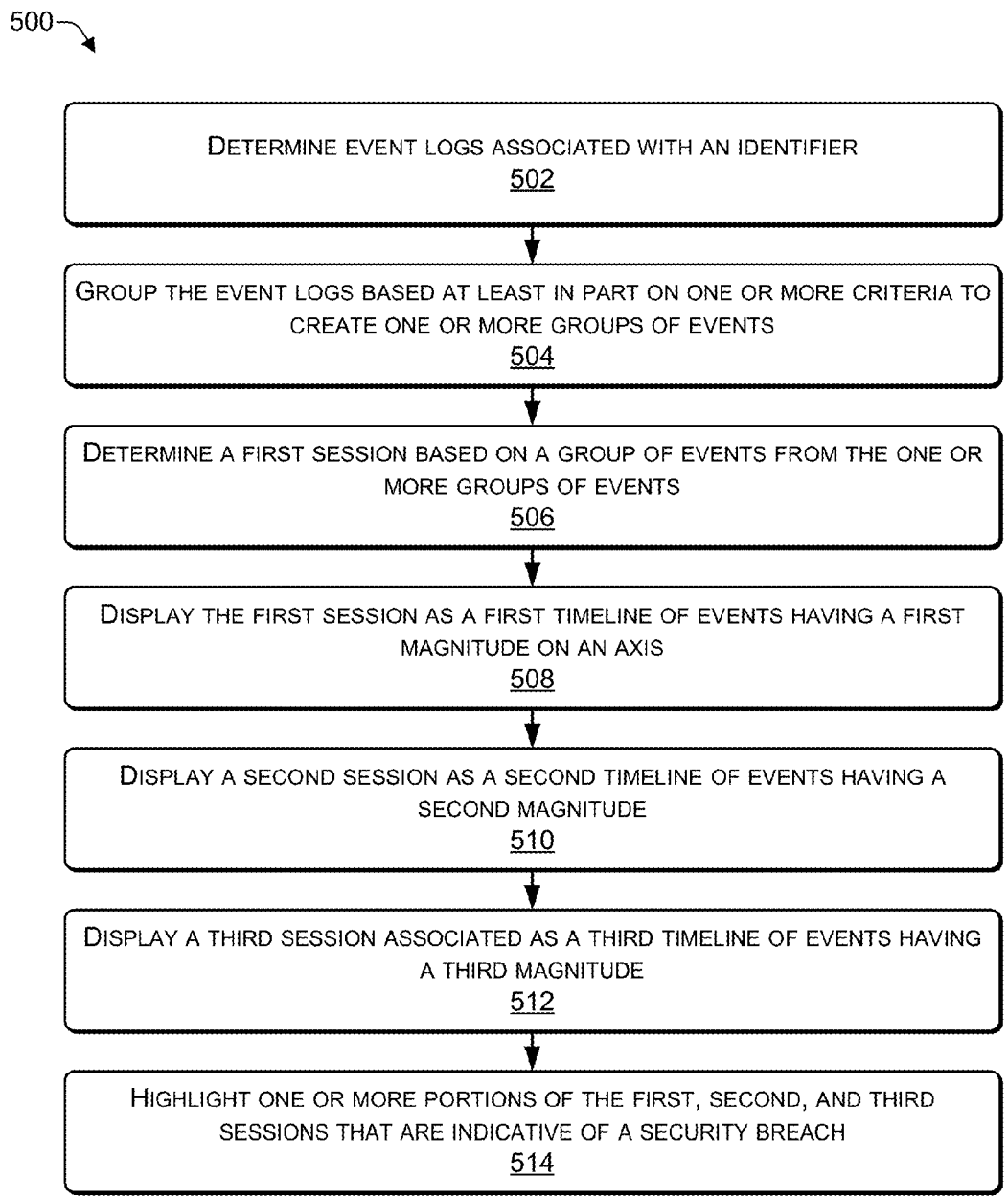
FIG. 5 is a flowchart of a process that includes grouping events logs based on one or more criteria according to some embodiments.

FIG. 5 is a flowchart of a process 500 that includes grouping events logs based on one or more criteria according to some embodiments. The process 500 may be performed by a software application, such as the auditing software 122 of FIG. 1.

At 502, event logs associated with an identifier may be determined. For example, in FIG. 1, the auditing software 122 may receive an identifier, such as a user identifier (e.g., the username 140) or a device identifier (e.g., an IP address of one of the network elements 102, 104, or 106). The auditing software 122 may identify the associated logs 136 that are associated with the identifier from the stored event logs 134 in the event log database 120. For example, in FIG. 2, the event logs 220, 222, 224, 226, 228, 230, 232, and 234 may be identified as being associated with the identifier 202. The identifier 202 may be a user identifier (e.g., username) of the first credentials 204, a user identifier of the second credentials 206, a device identifier of the first network element 208, or a device identifier of the second network element 210.

At 504, the event logs are grouped based at least in part on one or more criteria to create one or more groups of events. For example, the criteria may include a location (e.g., a network element) associated with each event log. For example, event logs may be grouped to create a first group of event logs that include a first device identifier associated with a first network element. The event logs may be grouped to create a second group of event logs that include a device identifier associated with a second network element. For example, in FIG. 2, a first group of event logs (used to create the first session 212) may include the event logs 220, 228, 230, and 234 that are associated with a same location, e.g., the first network element 208. A second group of event logs (used to create the sessions 214, 216) may include the event logs 222, 224, 226, 230, and 232 associated with the second network element 210.

The identifier 202 may be associated with a device from which an activity was initiated or a device to which the activity was directed. For example, an event log of the read event 230 may include a requesting device identifier of the first network element 208 that sent a read request to the second network element 210 and a receiving device identifier of the second network element 210 that received (and responded to) the read request.

At 506, a first session may be identified based on a group of events from the one or more group of events. An individual session (of the one or more sessions) may include a timeline of event logs, For example, event logs associated with a network element may be ordered based on a timestamp (e.g., the timestamp 146 of FIG. 1) included in each event log to create a timeline. Individual sessions may include a specified event. For example, a session may begin when a logon event, e.g., either a successful logon event or an unsuccessful logon event, is identified in a group of events logs. Thus, two sessions may be identified from a group of events that include two logon events, three sessions may be identified from a group of events that include three logon events, etc. For example, in FIG. 3, a first group of event logs associated with the first network element 208 may include the events 310, 312, 314, 316, 324, and 326. The first group of event logs may be used to identify the first session 302 and the second session 304. A second group of event logs associated with the second network element 210 may include the events 318, 320, 322, and 326. The second group of event logs may be used to identify the third session 306. In FIG. 3, a session may be created by identifying a specified first event (e.g., a logon event) that initiates the session and a specified second event (e.g., a logoff event) that ends the session. For example, the first session 302 may be created by identifying the events 310 and 312. The second session 304 may be created by identifying the events 314, 316, and other events (e.g., the events 324 and 326) associated with the first network element 208 that occur within a time period of the timeline 308. In some cases, each session may be aligned to a common timeline. For example, in FIG. 2, the sessions 212, 214, and 216 may be aligned to the common timeline 218. As another example, in FIG. 3, the sessions 302, 304, and 306 may be aligned to the common timeline 308.

At 508, a first session may be displayed as a first timeline of events having a first magnitude on an axis. At 510, a second session may be displayed as a second timeline of events having a second magnitude on the axis. At 512, a third session may be displayed as a third timeline of events having a third magnitude on an axis. In some cases, depending on the credentials and the network element, two or more of the first magnitude, the second magnitude, and the third magnitude may be the same. For example, in FIG. 2, the first session 212 is displayed at a first height on the Y-axis, the second session 214 is displayed at a second height on the Y-axis, and the third session 216 is displayed at a third height on the Y-axis. In FIG. 3, the first session 302 and the second session are both displayed at a first height on the Y-axis because they are associated with a user with the first credentials 204 that logs on to the first network element 208 during the timeline 308. In FIG. 3, the third session 306 is displayed at a second height on the Y-axis. Thus, the height at which the auditing software 122 displays the sessions 212, 214, and 216 may be based on (1) the network element associated with the events and (ii) the credentials associated with the network element. When a same set of credentials is used to logon to a same network element, each logon (e.g., successful logon or unsuccessful logon) may be used to create a session that is displayed at a same height, such as the sessions 302 and 304 of FIG. 3. When a same set of credentials is used to logon to different network elements, each logon (e.g., successful logon or unsuccessful logon) may be used to create a session that is displayed at a different height, such as the sessions 304 and 306 of FIG. 3. When two (or more) different sets of credentials are used to logon to a same network element, each logon (e.g., successful logon or unsuccessful logon) may be used to create a session that is displayed at a different height, such as the sessions 212 and 216 of FIG. 2.

At 514, portions of the first session, the second session, and the third session that may be indicative of a security breach may be highlighted. For example, in FIG. 2, the highlighted portion 236 may include the directory accessed event 226, the file created event 228, and the read event 230. As another example, in FIG. 3, the highlighted portion 328 may include the directory accessed event 322, the file created event 324, and the read event 326.

Thus, a system administrator may identify potential security breaches by selecting an identifier (e.g., a username or a unique user identifier, such as an IP address). In some cases, the system administrator may specify a time interval to filter the event logs. Auditing software may identify event logs associated with the identifier within the specified time interval and group the event logs based on a location (e.g., network element) associated with each event log. For example, event logs generated as a result of activities performed by a user logged on to a first network element and accessing a second network element may be identified based on (1) an identifier (e.g., a username) used by the user to logon to the network element, (2) a first device identifier (e.g., an IP address) of the first network element, or (3) a second device identifier of the second network element. Each group of event logs may be analyzed to identify one or more sessions that include a specified event, such as a logon event. For example, for each group of events, the auditing software 122 may identify and create one or more sessions in which each session starts with a logon event. The session may include events that occur after the logon event within the specified time interval. A session may end with a failed logon event, a logoff event, when a timestamp (e.g., the timestamp 146 of FIG. 1) of a next event is outside the specified time interval, or another type of specified event. Events in a session may be ordered according to a timestamp (e.g., the timestamp 146 of FIG. 1) of the events in the session to create a timeline of events.

The sessions may be aligned to a common timeline and displayed in at least two dimensions. For example, timeline of events in a session may be aligned to a timeline displayed on an X-axis and a height on the Y-axis of the session may depend on the credentials and the network element associated with the session. The events displayed in each session may be displayed to visually distinguish between severities of events.

The sessions that are created based on the groups of event logs may be displayed in a hierarchical manner, with a height and indentation of each session depending on the credentials, the network element, and other event log related information. The hierarchy may be configurable such that a system administrator may display the same data using different hierarchical views. For example, each hierarchical configuration may be designed to identify specific types of information associated with a security breach. To illustrate, a first hierarchical view may be used to view different credentials used to access network elements while a second hierarchical view may be used to view locations that are being accessed, etc.

The auditing software may identify (e.g., using highlighting or another technique) portions of the sessions that may indicate a security breach. The hierarchical visual display of the sessions may enable a system administrator to identify details associated with a security breach, such as the user credentials used during the security breach, the network elements accessed during the security breach, the data accessed during the security breach, when the security breach occurred, how the security breach occurred, other information associated with the security breach, or any combination thereof.

Figure 6:
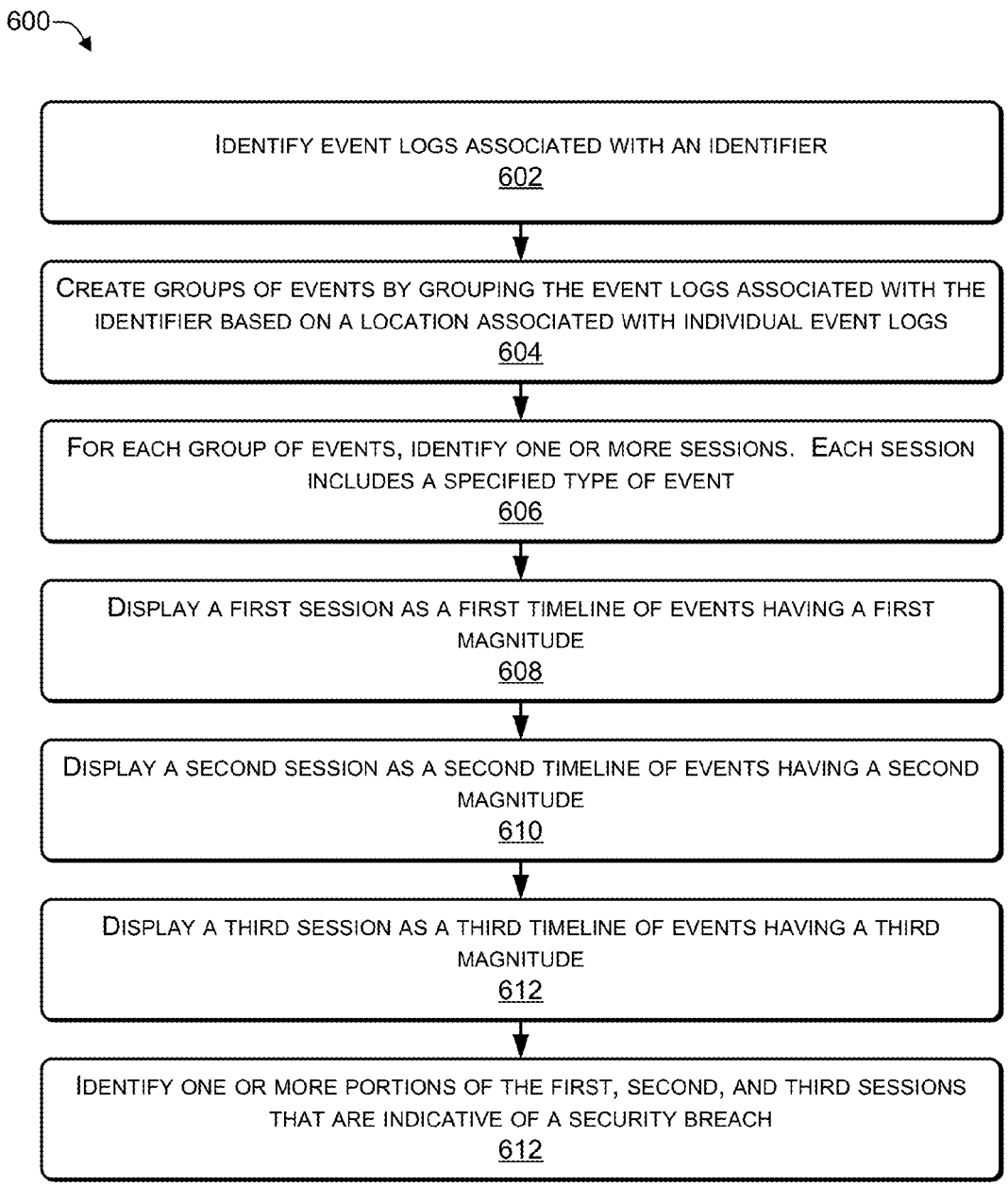
FIG. 6 is a flowchart of a process that includes identifying one or more portions of a first, second, and a third session that are indicative of a security breach according to some embodiments.

FIG. 6 is a flowchart of a process 600 that includes identifying one or more portions of a first, second, and a third session that are indicative of a security breach according to some embodiments. The process 600 may be performed by a software application, such as the auditing software 122 of FIG. 1.

At 602, event logs associated with an identifier may be identified. For example, in FIG. 1, the auditing software 122 may receive an identifier, such as a user identifier (e.g., the username 140) or a device identifier (e.g., an IP address of one of the network elements 102, 104, or 106). The auditing software 122 may identify the associated logs 136 that are associated with the identifier from the stored event logs 134 in the event log database 120. For example, in FIG. 2, the event logs 220, 222, 224, 226, 228, 230, 232, and 234 may be identified as being associated with the identifier 202. The identifier 202 may be a user identifier (e.g., username) of the first credentials 204, a user identifier of the second credentials 206, a device identifier of the first network element 208, or a device identifier of the second network element 210.

At 604, the event logs are grouped based at least in part on a location (e.g., a network element) associated each event log to create groups of events. For example, event logs may be grouped to create a first group of event logs that include a first device identifier associated with a first network element. The event logs may be grouped to create a second group of event logs that include a device identifier associated with a second network element. For example, in FIG. 2, a first group of event logs (used to create the first session 212) may include the event logs 220, 228, 230, and 234 that are associated with a same location, e.g., the first network element 208. A second group of event logs (used to create the sessions 214, 216) may include the event logs 222, 224, 226, 230, and 232 associated with the second network element 210.

The identifier 202 may be associated with a device from which an activity was initiated or a device to which the activity was directed. For example, an event log of the read event 230 may include a requesting device identifier of the first network element 208 that sent a read request to the second network element 210 and a receiving device identifier of the second network element 210 that received (and responded to) the read request.

At 606, for each group of events, one or more sessions may be identified. An individual session (of the one or more sessions) may include a specified type of event, such as a logon event. For example, a session may begin when a logon event, e.g., either a successful logon event or an unsuccessful logon event, is identified in a group of events logs. Thus, two sessions may be identified from a group of events that include two logon events, three sessions may be identified from a group of events that include three logon events, etc. The event logs in each group of events may be ordered based on a timestamp (e.g., the timestamp 146 of FIG. 1) included in each event log to create a session timeline. For example, in FIG. 3, a first group of event logs associated with the first network element 208 may include the events 310, 312, 314, 316, 324, and 326. The first group of event logs may be used to identify the first session 302 and the second session 304. A second group of event logs associated with the second network element 210 may include the events 318, 320, 322, and 326. The second group of event logs may be used to identify the third session 306. In FIG. 3, a session may be created by identifying a specified first event (e.g., a logon event) that initiates the session. In some cases, a specified second event (e.g., a logoff event) may end the session. For example, the first session 302 may be created by identifying the events 310 and 312. The second session 304 may be created by identifying the events 314, 316, and other events (e.g., the events 324 and 326) associated with the first network element 208 that occur within a time period of the timeline 308. In some cases, each session may be aligned to a common timeline. For example, in FIG. 2, the sessions 212, 214, and 216 may be aligned to the common timeline 218. As another example, in FIG. 3, the sessions 302, 304, and 306 may be aligned to the common timeline 308.

At 608, a first session may be displayed as a first timeline of events having a first magnitude. At 610, a second session may be displayed as a second timeline of events having a second magnitude. At 612, a third session may be displayed as a third timeline of events having a third magnitude. In some cases, depending on the credentials and the network element, two or more of the first magnitude, the second magnitude, and the third magnitude may be the same. For example, in FIG. 2, the first session 212 is displayed at a first height on the Y-axis, the second session 214 is displayed at a second height on the Y-axis, and the third session 216 is displayed at a third height on the Y-axis. In FIG. 3, the first session 302 and the second session are both displayed at a first height on the Y-axis because they are associated with a user with the first credentials 204 that logs on to the first network element 208 during the timeline 308. In FIG. 3, the third session 306 is displayed at a second height on the Y-axis. Thus, the height at which the auditing software 122 displays the sessions 212, 214, and 216 may be based on (1) the network element associated with the events and (ii) the credentials associated with the network element. When a same set of credentials is used to logon to a same network element, each logon (e.g., successful logon or unsuccessful logon) may be used to create a session that is displayed at a same height, such as the sessions 302 and 304 of FIG. 3. When a same set of credentials is used to logon to different network elements, each logon (e.g., successful logon or unsuccessful logon) may be used to create a session that is displayed at a different height, such as the sessions 304 and 306 of FIG. 3. When two (or more) different sets of credentials are used to logon to a same network element, each logon (e.g., successful logon or unsuccessful logon) may be used to create a session that is displayed at a different height, such as the sessions 212 and 216 of FIG. 2.

At 612, portions of the first session, the second session, and the third session that may be indicative of a security breach may be highlighted. For example, in FIG. 2, the highlighted portion 236 may include the directory accessed event 226, the file created event 228, and the read event 230. As another example, in FIG. 3, the highlighted portion 328 may include the directory accessed event 322, the file created event 324, and the read event 326.

Thus, a system administrator may identify potential security breaches by selecting an identifier (e.g., a username or a unique user identifier, such as an IP address). In some cases, the system administrator may specify a time interval to filter the event logs. Auditing software may identify event logs associated with the identifier within the specified time interval and group the event logs based on a location (e.g., network element) associated with each event log. For example, event logs generated as a result of activities performed by a user logged on to a first network element and accessing a second network element may be identified based on (1) an identifier (e.g., a username) used by the user to logon to the network element, (2) a first device identifier (e.g., an IP address) of the first network element, or (3) a second device identifier of the second network element. Each group of event logs may be analyzed to identify one or more sessions that include a specified event, such as a logon event. For example, for each group of events, the auditing software 122 may identify and create one or more sessions in which each session starts with a logon event. The session may include events that occur after the logon event within the specified time interval. A session may end with a failed logon event, a logoff event, when a timestamp (e.g., the timestamp 146 of FIG. 1) of a next event is outside the specified time interval, or another type of specified event. Events in a session may be ordered according to a timestamp (e.g., the timestamp 146 of FIG. 1) of the events in the session to create a timeline of events.

The sessions may be aligned to a common timeline and displayed in at least two dimensions. For example, timeline of events in a session may be aligned to a timeline displayed on an X-axis and a height on the Y-axis of the session may depend on the credentials and the network element associated with the session. The events displayed in each session may be displayed to visually distinguish between the severities of the events.

The sessions that are created based on the groups of event logs may be displayed in a hierarchical manner, with a height and indentation of each session depending on the credentials, the network element, and other event log related information. The hierarchy may be configurable such that a system administrator may display the same data using different hierarchical views. For example, each hierarchical configuration may be designed to identify specific types of information associated with a security breach. To illustrate, a first hierarchical view may be used to view different credentials used to access network elements while a second hierarchical view may be used to view locations that are being accessed, etc.

The auditing software may identify (e.g., using highlighting or another technique) portions of the sessions that may indicate a security breach. The hierarchical visual display of the sessions may enable a system administrator to identify details associated with a security breach, such as the user credentials used during the security breach, the network elements accessed during the security breach, the data accessed during the security breach, when the security breach occurred, how the security breach occurred, other information associated with the security breach, or any combination thereof.

Figure 7:
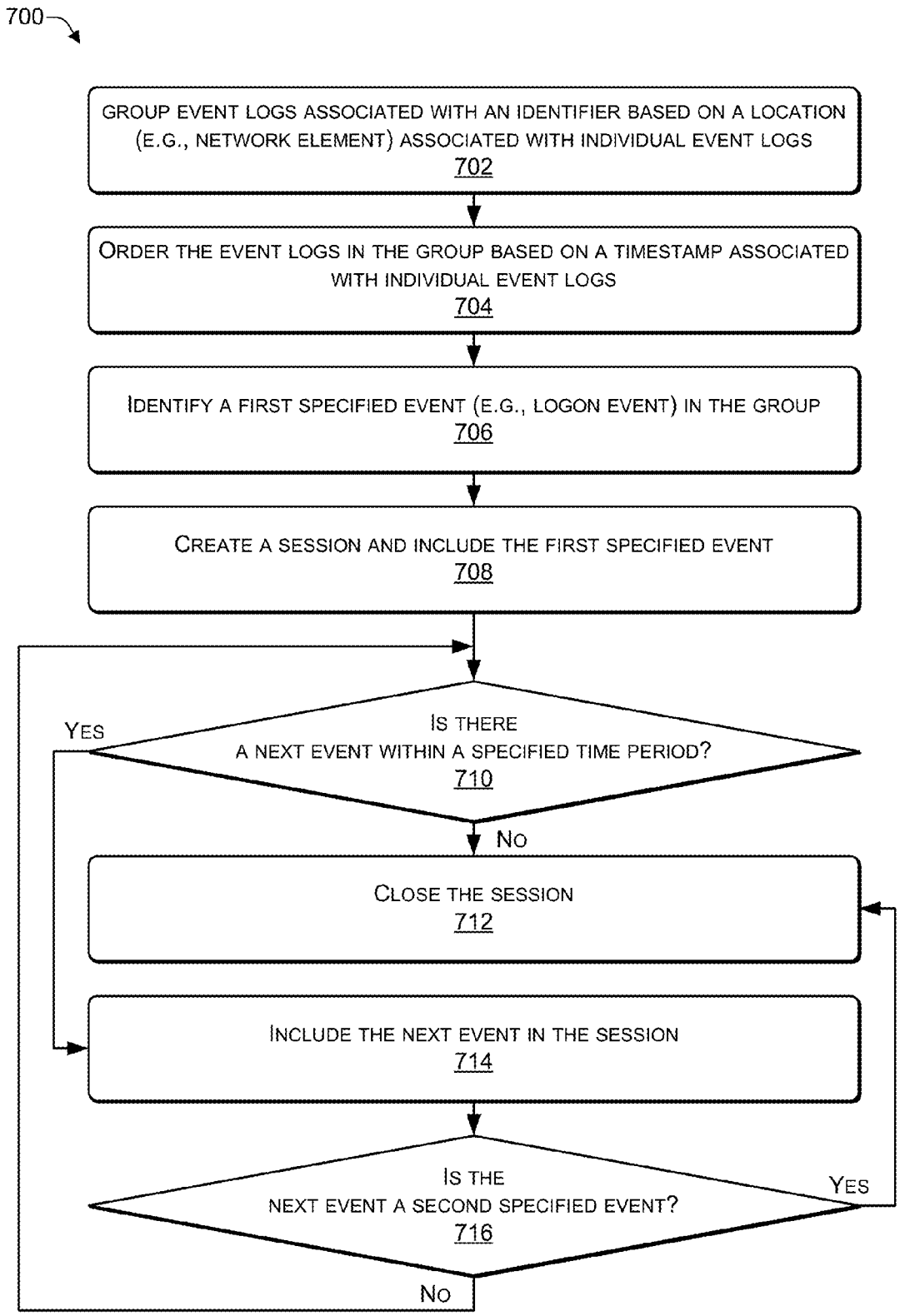
FIG. 7 is a flowchart of a process to create one or more sessions according to some embodiments.

FIG. 7 is a flowchart of a process 700 to create one or more sessions according to some embodiments. The process 700 may be performed by a software application, such as the auditing software 122 of FIG. 1.

At 702, event logs associated with an identifier may be grouped according to a location (e.g., a network element) associated with each event log. At 704, the event logs in the group may be ordered based on a timestamp associated with individual event logs. For example, in FIG. 1, the auditing software 122 may order event logs in a group based on the timestamp 146 associated with each event log.

At 706, a first specified event may be identified in the group of event logs. For example, the process 700 may traverse the event logs in the group in chronological order until it identifies a first specified event, such as a logon event.

At 708, a session may be created and the first specified event may be included in the session. For example, the session that is created may start with the first specified event, such as a logon event. A session may be created based on either a successful logon event or an unsuccessful logon event. A session with the unsuccessful logon may not have other events in the session.

At 710, a determination is made whether the group of event logs includes a next event within a specified time period. In response to determining, at 710, that the group of event logs does not include a next event within the specified time period, the session is closed, at 712. The process 700 may determine if the group of events includes an additional session by proceeding to 706 to identify an additional occurrence of the first specified event.

In response to determining, at 710, that the group of event logs includes a next event within the specified time period, the next event is included in the session, at 714. At 716, a determination is made whether the next event is a second specified event. In response to determining, at 716, that the next event is the second specified event, the session is closed, at 712. In response to determining, at 716, that the next event is not the second specified event, the process 700 proceeds to 710 and a determination is made whether the group of events includes a next event.

For example, in FIG. 2, a system administrator may specify the identifier 202 and the event logs 220, 222, 224, 226, 228, 230, 232, and 234 associated with the identifier 202 may be identified. The auditing software 122 may create two groups based on a location associated with each event log. The auditing software 122 may create a first group that includes the events 220, 228, 230, and 234 associated with the first network element 208. The auditing software 122 may create a second group that includes the events 222, 224, 226, 230, and 232 associated with the second network element 210. Note that in this example, the read event 230 is associated with both the first network element 208 and the second network element 210 because the read event 230 is associated with an activity that includes data being read from the second network element 210 and sent to the first network element 208. Thus, the read event 230 may be included in both groups.

The event logs in the first group may be sorted by timestamp to create a timeline of events. The chronologically ordered event logs in the first group are parsed to identify a first specified event, e.g., the logon event 220, causing the first session 212 to be created. The events 228, 230, and 234 may be added to the first session 212. In some cases, the first session 212 may be closed because a second specified event, e.g., the logoff event 234, was identified. In other cases, the first session 212 may be closed because the logoff event 234 is a last event associated with the first network element 208 within the timeline 218, e.g., additional events associated with the first network element 208 after the logoff event 234 are outside of the timeline 218.

The event logs in the second group may be sorted by timestamp to create a timeline of events. The process 700 may parse the chronologically ordered event logs in the second group to identify a first specified event, e.g., the failed logon event 222, causing the second session 214 to be created. The second session 214 may be closed because there are no further events using the first credentials 204 at the second network element 210 or because the failed logon event 222 comprises the second specified event. The process 700 may continue parsing the chronologically ordered event logs in the second group to identify a first specified event, e.g., the logon event 224, causing the third session 216 to be created. The events 226, 230, and 232 may be added to the third session 216. In some cases, the third session 216 may be closed because a second specified event, e.g., the logoff event 232, was identified. In other cases, the third session 216 may be closed because the logoff event 232 is a last event associated with the second network element 210 within the timeline 218, e.g., additional events associated with the second network element 210 after the logoff event 232 are outside of the timeline 218. Thus, the second session 214 and the third session 216 may be created from the second group of events.

As another example, in FIG. 3, a system administrator may specify the identifier 202 and the event logs 310, 312, 314, 316, 318, 320, 322, 324, and 326 associated with the identifier 202 may be identified. The auditing software 122 may create two groups based on a location associated with each event log. The auditing software 122 may create a first group that includes the events 310, 312, 314, 316, 324, and 326 associated with the first network element 208. The auditing software 122 may create a second group that includes the events 318, 320, 322, and 326 associated with the second network element 210. Note that in this example, the read event 326 is associated with both the first network element 208 and the second network element 210 because the read event 230 is associated with an activity that includes data being read from the second network element 210 and sent to the first network element 208.

The event logs in the first group may be sorted by timestamp to create a timeline of events. The chronologically ordered event logs in the first group may be parsed to identify a first specified event, e.g., the logon event 310, causing the first session 302 to be created. The logoff event 312 may be added to the first session 302. The first session 302 may be closed because a second specified event, e.g., the logoff event 312, was identified. The process 700 may continue parsing the chronologically ordered event logs in the first group to identify a first specified event, e.g., the logon event 318, causing the third session 306 to be created. The events 320, 322, and 326 may be added to the third session 306. In some cases, the third session 306 may be closed because a second specified event, e.g., the logoff event 320, was identified. In other cases, the third session 306 may be closed because the logoff event 320 is a last event associated with the second network element 210 within the timeline 308, e.g., additional events associated with the second network element 210 after the logoff event 320 are outside of the timeline 308. Thus, the first session 302 and the third session 306 may be created from the first group of events.

The event logs in the second group may be sorted by timestamp to create a timeline of events. The process 700 may parse the chronologically ordered event logs in the second group to identify a first specified event, e.g., the logon event 314, causing the second session 304 to be created. The events 324, 326, and 316 may be added to the second session 304. In some cases, the second session 304 may be closed because a second specified event, e.g., the logoff event 316, was identified. In other cases, the second session 304 may be closed because the logoff event 316 is a last event associated with the first network element 208 within the timeline 308, e.g., additional events associated with the first network element 208 after the logoff event 316 are outside of the timeline 308.

Thus, event logs associated with a specified identifier may be grouped based on a location (e.g., network element) associated with each event log. The event logs may be ordered based on a timestamp of each event logs. The chronologically ordered event logs may be parsed to identify a first specified event (e.g., a logon event). When the first specified event is identified, a session may be created and the first specified event added to the session. Additional events may be added until a second specified event (e.g., a logoff event) is identified or there are no more event logs within the specified time period. The process may be repeated until one or more sessions are created from each group of event logs. By identifying sessions in this way and displaying the sessions using a hierarchical structural, a system administrator may be easily determine details associated with a security breach.

Figure 8:
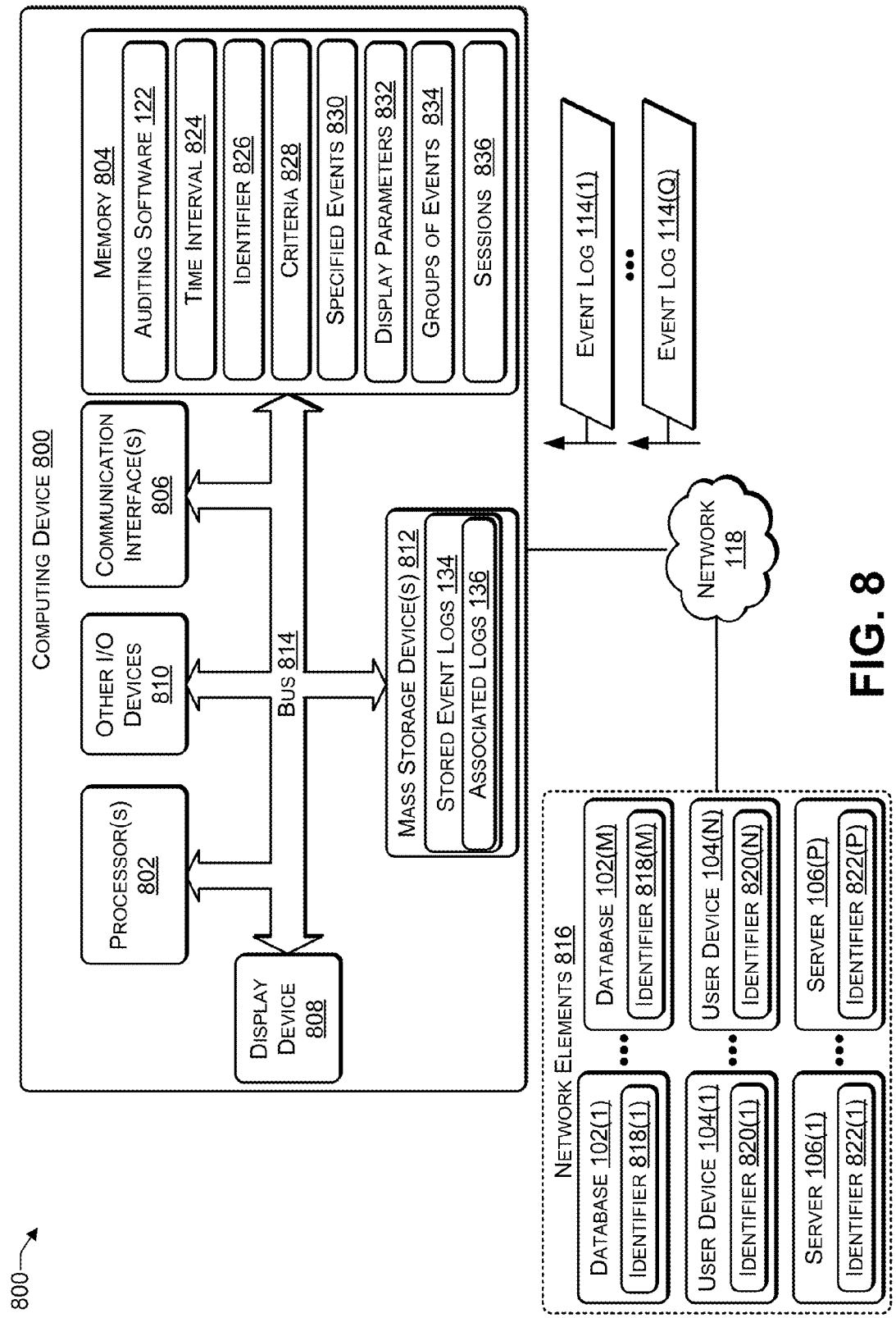
FIG. 8 illustrates an example configuration of a computing device that can be used to implement the systems and techniques described herein.

FIG. 8 illustrates an example configuration of a computing device that can be used to implement the systems and techniques described herein, such as to implement the central server 116 of FIG. 1. The computing device 800 may include at least one processor 802, a memory 804, communication interfaces 806, a display device 808, other input/output (I/O) devices 810, and one or more mass storage devices 812, configured to communicate with each other, such as via a system bus 814 or other suitable connection.

The processor 802 is a hardware device that may include a single processing unit or a number of processing units, all of which may include single or multiple computing units or multiple cores. The processor 802 can be implemented as one or more microprocessors, microcomputers, microcontrollers, digital signal processors, central processing units, state machines, logic circuitries, and/or any devices that manipulate signals based on operational instructions. Among other capabilities, the processor 802 can be configured to fetch and execute computer-readable instructions stored in the memory 804, mass storage devices 812, or other computer-readable media.

Memory 804 and mass storage devices 812 are examples of computer storage media (e.g., memory storage devices) for storing instructions which are executed by the processor 802 to perform the various functions described above. For example, memory 804 may generally include both volatile memory and non-volatile memory (e.g., RAM, ROM, or the like) devices. Further, mass storage devices 812 may include hard disk drives, solid-state drives, removable media, including external and removable drives, memory cards, flash memory, floppy disks, optical disks (e.g., CD, DVD), a storage array, a network attached storage, a storage area network, or the like. Both memory 804 and mass storage devices 812 may be collectively referred to as memory or computer storage media herein, and may be a media capable of storing computer-readable, processor-executable program instructions as computer program code that can be executed by the processor 802 as a particular machine configured for carrying out the operations and functions described in the implementations herein.

The computing device 800 may also include one or more communication interfaces 806 for exchanging data via the network 118 with network elements 816. The communication interfaces 806 can facilitate communications within a wide variety of networks and protocol types, including wired networks (e.g., Ethernet, DOCSIS, DSL, Fiber, USB etc.) and wireless networks (e.g., WLAN, GSM, CDMA, 802.11, Bluetooth, Wireless USB, cellular, satellite, etc.), the Internet and the like. Communication interfaces 806 can also provide communication with external storage (not shown), such as in a storage array, network attached storage, storage area network, or the like. The network elements 816 may include the databases 102, the user devices 104, and the server devices 106. Each of the network elements 816 may include a unique device identifier, such as an IP identifier or other unique device identifier. For example, each of the databases 102(1) to 102(M) may include a corresponding identifier 818(1) to 818(M), each of the user devices 104(1) to 104(N) may include a corresponding identifier 820(1) to 820(N), and each of the servers 106(1) to 106(P) may include a corresponding identifier 822(1) to 822(P). The event logs 114(1) to 114(Q) may be generated by agents assigned to monitor activities associated with the network elements 816.

A display device 808, such as a monitor may be included in some implementations for displaying information and images to users. Other I/O devices 810 may be devices that receive various inputs from a user and provide various outputs to the user, and may include a keyboard, a remote controller, a mouse, a printer, audio input/output devices, and so forth.

The computer storage media, such as memory 804 and mass storage devices 812, may be used to store software and data. For example, the computer storage media may be used to store the auditing software 122 of FIG. 1, a time interval 824, an identifier 826, criteria 828, specified events 830, display parameters 832, groups of events 834, and sessions 836. The display parameters 832 may include hierarchical information 838. For example, a system administrator of the computer system 100 of FIG. 1 may specify the identifier 826. The identifier 826 may include a user identifier (e.g., username from a set of credentials) or a device identifier (e.g., one of the device identifiers 818, 820, 922). The system administrator may also specify the time interval 824. The auditing software 122 may identify the associated logs 136 that are associated with the identifier 826 and that occurred within the specified time interval 824. The auditing software 122 may group the associated logs 136 based the criteria 828. For example, the criteria 828 may indicate that the associated logs 136 are to be grouped based on an identifier, such as a location (e.g., one of the device identifiers 818, 820, 922 associated with the network elements 816) associated with each event log. The auditing software 122 may group the associated logs 136 based the criteria 828 to create the one or more groups of events 834. The auditing software 122 may identify one or more of the sessions 836 from the groups of events 834. For example, the sessions 836 may be identified based on one or more of the specified events 830. For example, the specified events may indicate that a session is to be created when a logon event is identified and the session is to be closed after a logoff event has been identified and added to the session.

The auditing software 122 may display the sessions 836 on the display device 808 based on the display parameters 832. For example, the display parameters 832 may specify a hierarchical structure for displaying the sessions 836, e.g., the sessions may be displayed with user credentials at a first (e.g., highest) level, followed by network elements at a lower level. As another example, the display parameters 832 may specify to display the network elements at the first level followed by user credentials at a lower level. Of course, other types of hierarchical arrangements may be specified by the display parameters 832. The display parameters 832 may indicate how each event in a session is to be displayed. For example, the display parameters 832 may specify that when a particular event has a particular severity, the particular event is to be displayed using a particular graphical image (e.g., a geometric shape, an icon, a symbol, etc.), a size of the particular graphical image, particular text (e.g., "high severity", "medium severity", "low severity", or the like), a particular color (e.g., red, orange, yellow, etc.), another type of display parameter, or any combination thereof. For example, an event log of high severity may be displayed as a large-sized red hexagon with the text "high severity," an event log of medium severity may be displayed as a medium-sized orange triangle with the text "medium severity," and an event log of low severity may be displayed as a small-sized yellow circle with the text "low severity."

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations, as described and as illustrated in the drawings. However, this disclosure is not limited to the implementations described and illustrated herein, but can extend to other implementations, as would be known or as would become known to those skilled in the art. Reference in the specification to "one implementation," "this implementation," "these implementations" or "some implementations" means that a particular feature, structure, or characteristic described is included in at least one implementation, and the appearances of these phrases in various places in the specification are not necessarily all referring to the same implementation.

Software modules include one or more of applications, bytecode, computer programs, executable files, computer-executable instructions, program modules, software code expressed as source code in a high-level programming language such as C, C++, Perl, or other, a low-level programming code such as machine code, etc. An example software module is a basic input/output system (BIOS) file. A software module may include an application programming interface (API), a dynamic-link library (DLL) file, an executable (e.g., .exe) file, firmware, and so forth.

Processes described herein may be illustrated as a collection of blocks in a logical flow graph, which represent a sequence of operations that can be implemented in hardware, software, or a combination thereof. In the context of software, the blocks represent computer-executable instructions that are executable by one or more processors to perform the recited operations. The order in which the operations are described or depicted in the flow graph is not intended to be construed as a limitation. Also, one or more of the described blocks may be omitted without departing from the scope of the present disclosure.

Although various embodiments of the method and apparatus of the present invention have been illustrated herein in the Drawings and described in the Detailed Description, it will be understood that the invention is not limited to the embodiments disclosed, but is capable of numerous rearrangements, modifications and substitutions without departing from the scope of the present disclosure.

What is claimed is:

1. A computer-implemented method, comprising:
    identifying, in an event log database, a plurality of event logs associated with an identifier and having corresponding timestamps that are within a specified time interval;
    grouping, by auditing software executed by one or more processors of a central server, the plurality of event logs based at least in part on one or more criteria to create one or more groups of events, the criteria including a location associated with each event log of the plurality of event logs;

determining, by the auditing software, a first session based on a group of events from the one or more groups of events, the group of events starting with a specified type of event that includes a logon event; and displaying the first session as a first timeline of events in a graphical interface, wherein the logon event is displayed on the graphical interface as a starting point on the first timeline.

2. The computer-implemented method of claim 1, wherein the identifier comprises at least one of an internet protocol (IP) address associated with the first network element or a username included in user credentials used to logon to the first network element.

3. The computer-implemented method of claim 1, further comprising:

displaying, in the graphical interface, a second session associated with a second network element, wherein the first timeline of events is displayed in the graphical interface with a first magnitude on an axis and the second session is displayed as a second timeline of events in the graphical interface with a second magnitude on the axis.

4. The computer-implemented method of claim 3, further comprising:

displaying the first timeline and the second timeline hierarchically in the graphical interface based at least in part on:
an individual set of user credentials associated with individual event logs; and
an individual network element associated with the individual event logs.

5. The computer-implemented method of claim 1, wherein the one or more criteria include a network element identifier.

6. The computer-implemented method of claim 1, wherein:
the first timeline of events is aligned to a common timeline in the graphical interface.

7. One or more non-transitory computer-readable media storing instructions that are executable by one or more processors to perform operations comprising:

identifying, from an event log database including a plurality of stored event logs, one or more event logs associated with an identifier;

grouping, by the one or more processors, the one or more event logs based on one or more criteria to create one or more groups of events, the one or more criteria including a location associated with each event log of the plurality of event logs;

determining, by the one or more processors, a first session based on a group of events of the one or more groups of events, the first session including a specified type of event that includes a logon event, the first session is associated with a first network element; and displaying the first session as a first timeline of events in a graphical interface, wherein the logon event is displayed on the graphical interface as a starting point on the first timeline, the first session having a first magnitude on an axis.

8. The one or more non-transitory computer-readable media of claim 7, wherein:
the first network element comprises one of a user computing device, a server computing device, or a database hosting device.

9. The one or more non-transitory computer-readable media of claim 7, wherein a size of an event displayed in the first session on the graphical interface is proportional to a severity of the event.

10. The one or more non-transitory computer-readable media of claim 7, wherein a color of an event displayed in the first session on the graphical interface is indicative of a severity of the event.

11. The one or more non-transitory computer-readable media of claim 7, further comprising:

displaying a second session associated with a second network element as a second timeline of events on the graphical interface, the second session having a second magnitude that is different from the first magnitude.

12. The one or more non-transitory computer-readable media of claim 7, further comprising:

displaying a third session associated with the first network element as a third timeline of events on the graphical interface, the third session having the first magnitude on the axis.

13. A server, comprising:
one or more processors; and
one or more non-transitory computer-readable media storing instructions that are executable by the one or more processors to perform operations comprising:

identifying, in an event log database, a plurality of event logs based at least in part on an identifier;

creating, by the one or more processors, one or more groups of events by grouping the plurality of event logs based at least in part on a location associated with individual event logs of the plurality of event logs;

determining, by the one or more processors, a plurality of sessions based at least in part on the groups of events, individual sessions of the plurality of sessions including a specified type of event that includes a logon event, the plurality of sessions including at least a first session and a second session;

displaying the first session as a first timeline of events in a graphical interface, the first session having a first magnitude; and displaying the second session as a second timeline of events in the graphical interface, the second session having a second magnitude.

14. The server of claim 13, wherein:
the first session is associated with a first network element;
the second session is associated with the first network element; and
the second magnitude comprises the first magnitude.

15. The server of claim 13, wherein:
the first session is associated with a first network element;
the second session is associated with a second network element; and
the second magnitude is different than the first magnitude.

16. The server of claim 13, the operations further comprising:

displaying a third session associated with a second network element as a third timeline of events in the graphical interface, the third session having a third magnitude.

17. The server of claim 13, wherein the plurality of event logs include at least one of: a logon event log, a logoff event log, a failed logon event log, a directory accessed event log, a file created event log, a directory accessed event log, a read data event log, or a copy data event log.

18. The server of claim 13, wherein a first set of event logs in the first timeline of events is displayed in the graphical interface in an order according to a timestamp associated with each event log in the first set of event logs.

19. The server of claim 13, wherein identifying the plurality of event logs based at least in part on the identifier comprises:

identifying the plurality of event logs based at least in part on the identifier and based at least in part on a specified time interval.

\* \* \* \* \*